(12) United States Patent
Manzalini et al.

(10) Patent No.: US 7,688,732 B2
(45) Date of Patent: Mar. 30, 2010

(54) SYSTEM AND METHOD FOR THE AUTOMATIC SETUP OF SWITCHED CIRCUITS BASED ON TRAFFIC PREDICTION IN A TELECOMMUNICATIONS NETWORK

(75) Inventors: Antonio Manzalini, Turin (IT); Alessandro D'Alessandro, Turin (IT); Salvatore Spadaro, Barcelona (ES); Josep Sole' Pareta, Barcelona (ES); Oscar Pisa Martinez, Turin (IT)

(73) Assignee: Telecom Italia S.p.A., Milan (IT)

( * ) Notice: Subject to any disclaimer, the term of this patent is extended or adjusted under 35 U.S.C. 154(b) by 582 days.

(21) Appl. No.: 10/584,078

(22) PCT Filed: Dec. 23, 2003

(86) PCT No.: PCT/EP03/14800

§ 371 (c)(1),
(2), (4) Date: Jun. 22, 2006

(87) PCT Pub. No.: WO2005/064983

PCT Pub. Date: Jul. 14, 2005

(65) Prior Publication Data

US 2007/0121507 A1    May 31, 2007

(51) Int. Cl.
*H04J 1/16* (2006.01)
(52) U.S. Cl. .................................. 370/235; 370/230
(58) Field of Classification Search ............ 370/228, 370/235, 252, 412
See application file for complete search history.

(56) References Cited

U.S. PATENT DOCUMENTS

| | | | |
|---|---|---|---|
| 6,314,105 B1 | 11/2001 | Luong | |
| 6,507,648 B1 | 1/2003 | Golka et al. | |
| 7,289,437 B2 * | 10/2007 | Chiruvolu | 370/228 |
| 2002/0176369 A1 * | 11/2002 | Porikli et al. | 370/252 |
| 2003/0067880 A1 | 4/2003 | Chiruvolu | |
| 2004/0131067 A1 * | 7/2004 | Cheng et al. | 370/412 |

FOREIGN PATENT DOCUMENTS

JP    2003-324473    11/2003

OTHER PUBLICATIONS

Iovanna et al., "A Traffic Engineering System for Multilayer Networks Based on the GMPLS Paradigm", XP-001149575, IEEE Network, vol. 17, No. 2, pp. 28-37, (2003).

(Continued)

*Primary Examiner*—Chi H Pham
*Assistant Examiner*—Albert T Chou
(74) *Attorney, Agent, or Firm*—Finnegan, Henderson, Farabow, Garrett & Dunner, L.L.P.

(57) ABSTRACT

An optical network is configured so as to dedicate a first portion of lightpaths to high priority traffic and leave a second portion of lightpaths available for low priority traffic. The high priority traffic entering the high priority lightpaths is monitored. In case of detection of a burst in high priority traffic, at least one of the low priority lightpaths is torn down, so as to make available network resources within the network. Then, a new temporary lightpath is set up using the available network resources, and high priority traffic is routed on the temporary lightpath.

22 Claims, 8 Drawing Sheets

OTHER PUBLICATIONS

Haykim, "Stochastic Gradient-Based Algorithms", Adaptive Filter Theory, Prentice Hall, pp. 299-356, (1991).

"Link Capacity Adjustment Scheme (LCAS) For virtual Concatenated Signals", ITU-T New Recommendation G. 7042/Y.1305, pp. 1-22, (Aug. 2001).

Adas et al., "Using Adaptive Linear Prediction to Support Real-Time VBR Video Under RCBR Network Service Model", IEEE/ACM Transactions on Networking, vol. 6, No. 5, pp. 635-644, (1998).

Gençata, "Virtual-Topology Adaptation for WDM Mesh Networks Under Dynamic Traffic", IEEE/ACM Transactions on Networking, vol. 11, No. 2, pp. 236-247, (2003).

English translation of the Official Action dispatched Jul. 22, 2009 from the Japanese Patent Office for counterpart Japanese Patent Application No. 512671-2005.

* cited by examiner

SYSTEM AND METHOD FOR THE AUTOMATIC SETUP OF SWITCHED CIRCUITS BASED ON TRAFFIC PREDICTION IN A TELECOMMUNICATIONS NETWORK

CROSS REFERENCE TO RELATED APPLICATION

This application is a national phase application based on PCT/EP2003/014800, filed Dec. 23, 2003, the content of which is incorporated herein by reference.

BACKGROUND OF THE INVENTION

1. Field of the Invention

The present invention relates to a system and a method for an automatic set-up and tear down of switched circuits based on the monitoring and/or forecasting of the ingress packet traffic in nodes of a telecommunications network.

2. Description of the Related Art

TDM (Time Division Multiplexing) transport networks (e.g. SDH) have been basically designed for voice and leased line services. In the last years many network operators have largely deployed SDH transport platforms in both long haul and metropolitan/regional networks. However, today it is widely recognized that traffic on transport networks will be progressively dominated by data traffic (especially Internet-based), with respect to traditional voice traffic, due to a progressive migration of many applications and services over the Internet Protocol (IP), and thanks to the introduction of high-speed access technology. The introduction of WDM (Wavelength Division Multiplexing) or DWDM (Dense Wavelength Division Multiplexing) optical point-to-point systems is already providing high capacity links in order to cope with the growing of the traffic demands. On the other hand, the statistical characteristics of this growing data traffic (especially IP traffic) are rather different from those of traditional voice traffic. As a whole, IP traffic is not easily predictable and stable as the traditional voice traffic. In turn, IP traffic may show unpredictable traffic bursts. Consequently, main requirements for new-generation transport networks include flexibility and ability to react to traffic demand changes with time. Another key issue relates to the fact that even though the data traffic (especially Internet traffic) is becoming dominant, it does not generate revenue as do valuable voice services. Practically, this means that if a network was upgraded by adding bandwidth and expanding infrastructure in proportion to the amount of data traffic increase, the revenues would be smaller than the overall costs. For this reasons, network operators are seeking both to accommodate increasing bandwidth demands for data traffic and to dynamically provide optical connections, trying to make an optimal use of the available network resources and saving operating costs. For example, simply dimensioning a transport network to cope with data traffic bursts could be inefficient and expensive.

Traffic engineering (TE) is the process to control traffic flows in a network in order to optimize resource use and network performance. Practically, this means choosing routes taking into account traffic load, network state, and user requirements such as Quality of Service (QoS) or bandwidth, and moving traffic from more congested paths to less congested ones.

In order to achieve TE in an Internet network context, the Internet Engineering Task Force (IETF) has introduced MPLS (Multi Protocol Label Switching). The MPLS scheme is based on the encapsulation of IP packets into labeled packets that are forwarded in a MPLS domain along a virtual connection called label switched path (LSP). MPLS routers are called label switched routers (LSRs), and the LSRs at the ingress and egress of a MPLS domain are called edge LSRs (E-LSRs). Each LSP can be set up at the ingress LSR by means of ordered control before packet forwarding. This LSP can be forced to follow a route that is calculated a priori thanks to the explicit routing function. Moreover, MPLS allows the possibility to reserve network resources on a specific path by means of suitable signaling protocols. In particular, each LSP can be set up, torn down, rerouted if needed, and modified by means of the variation of some of its attributes. Furthermore, preemption mechanisms on LSPs can also be used in order to favor higher-priority data flows at the expense of lower-priority ones, while avoiding congestion in the network.

To extend the features of the MPLS technique, a generalized version of the same has also been proposed, known as GMPLS. GMPLS encompasses time-division (e.g. SONET/SDH, PDH, G.709), wavelength, and spatial switching (e.g. incoming port or fiber to outgoing port or fiber). The establishment of LSPs that span only Packet Switch Capable (PSC) or Layer-2 Switch Capable (L2SC) interfaces is defined for the MPLS and/or MPLS-TE control planes. GMPLS extends these control planes to support all the interfaces (i.e. layers): Packet Switch Capable (PSC) interfaces, Layer-2 Switch Capable (L2SC) interfaces, Time-Division Multiplex Capable (TDM) interfaces, $\lambda$-Switch Capable (LSC) interfaces, Fiber-Switch Capable (FSC) interfaces. According to current standards, the GMPLS control plane can support three models: overlay, augmented and a peer (integrated) models. These models are differentiated based on the amount of routing/topological information exchanged between the layer networks.

P. Iovanna, R. Sabella, M. Settembre, in the article "A Traffic Engineering System for Multilayer Networks Based on the GMPLS Paradigm", IEEE Network, March-April 2003, pag. 28-35, propose a traffic engineering system able to dynamically react to traffic changes while at the same time fulfilling QoS requirements for different classes of service. The solution by the authors consists of a hybrid routing approach, based on both offline methods and online methods, and a bandwidth management system that handles priority, preemption mechanisms, and traffic rerouting in order to concurrently accommodate the largest amount of traffic and fulfill QoS requirements. More specifically, the TE system invokes an offline procedure to achieve global optimization of path calculation, according to an expected traffic matrix, while invoking an online routing procedure to dynamically accommodate, sequentially, actual traffic requests, allowing reaction to traffic changes. The building blocks of the TE system are: a path provisioning module, a dynamic provisioning module, a bandwidth engineering module. The path provisioning module calculates offline the routes for all foreseen connections, according to a traffic matrix that describes the traffic relationships between each network node pair, on the basis of the physical topology of the network and information about network resources (e.g., presence of wavelength conversion inside optical cross connects, link capacity). The dynamic routing module evaluates the route for a single LSP request at a time, expressed in terms of source and destination nodes and bandwidth requirements. Basically, the dynamic routing algorithm finds a route aimed at better utilizing network resources by using less congested paths instead of shortest, but heavily loaded paths. The TE system is based on elastic use of bandwidth: the bandwidth can be temporary released by higher priority LPSs and put at disposal of all the lower priority LPSs. This can be done provided that the bandwidth is immediately given back to high priority traffic as soon as needed. When a higher priority LSP requires more bandwidth and at least one link on its path is congested, the bandwidth engineering module is invoked to make the required bandwidth available. The bandwidth engineering module can be represented by a preemption module that tears down all the LSPs whose priority level is lower than that of the LSP to be accommodated.

A. Gençata and B. Mukherjee, in the article "Virtual-To-pology Adaptation for WDM Mesh Networks Under Dynamic Traffic", IEEE/ACM Transactions on Networking, Vol. 11, No. 2, April 2003, pag. 236-247, propose an approach for the virtual-topology reconfiguration problem for a WDM based optical wide-area mesh network under dynamic traffic demand. The key idea of the authors' approach is to adapt the underlying optical connectivity by measuring the actual traffic load on lightpaths continuously (periodically based on a measurement period), and reacting promptly to the load imbalances caused by fluctuations on the traffic, by either adding or deleting one or more lightpaths at a time. When a load imbalance is encountered, it is corrected either by tearing down a lightpath that is lightly loaded or by setting up a new lightpath when congestion occurs.

U.S. patent application No. 2003/0067880 discloses a system and a method of implementing Routing Stability-Based Integrated Traffic Engineering for use in an MPLS/optical network. Incoming network traffic is classified as high priority, which can tolerate limited rerouting. In accordance with one embodiment, high priority traffic trunks are mapped onto direct light channels (or LSPs) and rerouted only in the event of a light channel tear down due to poor traffic utilization. According to the applicant of '880 patent application, a direct light channel, or LSP, is one that comprises a direct optical connection between an ingress/egress node pair via one or more OXCs. Low priority traffic trunks are mapped onto direct light channels if available; otherwise, they are mapped onto multi-hop LSPs with appropriate optical/electrical/optical conversions at the edge nodes serving as intermediate hops. According to the applicant of '880 patent application, a multi-hop light channel, or LSP, is one that constitutes more than one light channel and hence comprises an optical connection between an ingress/egress node pair via one or more OXCs and one or more edge nodes other than the ingress/egress nodes. The optical/electrical/optical conversions at the intermediate nodes may introduce packet delays for the traffic mapped onto multi-hop LSPs. Each such low priority traffic trunk is associated with a rerouting timer that is set at the time of rerouting, so as to prevent another rerouting of the trunk until the timer expires.

SUMMARY OF THE INVENTION

The Applicant has found that in order to cope with the dynamic changes in the data traffic demand, a management of the switched circuits (e.g. lightpaths of a WDM network and/or TDM circuits of a circuit-switched network, such as a SDH/SONET network) available at a "server" layer in an optical transport network advantageously allows to keep limited the size of the network.

According to the Applicant, the problem of coping with the dynamic changes in the data traffic demand can be solved, maintaining a limited size of the network, by concentrating the attention on high priority (i.e. "premium") traffic. Resources are dedicated at a circuit "server" layer (e.g. lightpaths and/or TDM circuits) to high priority traffic, in addition to the resources dedicated at the electronic packet "client" layer (e.g. LSPs, portions of LSP bandwidth, interfaces). More particularly, the Applicant has found that by configuring an optical network in advance so as to dedicate a first portion of switched circuits (e.g. lightpaths and/or TDM circuits) to high priority traffic, and leaving a second portion of switched circuits available for low priority traffic, the problem of coping with traffic bursts can be solved by monitoring the high priority traffic entering the high priority switched circuits. In case of detection of a burst in high priority traffic, at least one of the low priority switched circuit can be torn down, so as to make available network resources within the network. Then, a new temporary switched circuit is set up using the network resources made available after the tearing down of the low priority switched circuit, and high priority traffic is routed on the new temporary switched circuit.

In a first aspect, the invention relates to a method of managing traffic in an optical network. The method comprises:

tagging a first portion of traffic in ingress to at least one node of said network as high priority traffic and a second portion of traffic in ingress to said at least one node as low priority traffic;

configuring at least a portion of said network so that a first portion of switched circuits exiting from said at least one node is adapted to carry said high priority traffic and a second portion of switched circuits exiting from said at least one node is adapted to carry said low priority traffic;

detecting a burst of said high priority traffic;

after said step of detecting said burst, acting on at least a portion of said low priority traffic, so as to deplete at least one interface of said at least one node, connected to at least one switched circuit of said second portion of switched circuits;

tearing down at least one switched circuit connected to said at least one depleted node interface;

setting up at least one new temporary switched circuit starting from said at least one depleted node interface;

forwarding a portion of said high priority traffic to said at least one depleted node interface, and, thereby, to said new temporary switched circuit.

The step of detecting a burst preferably comprises:

estimating a first bandwidth of said high priority traffic in a first predetermined time interval;

comparing said first bandwidth with a first predetermined threshold.

The step of acting on at least a portion of low priority traffic is preferably carried out if said first bandwidth exceeds said first predetermined threshold.

The step of estimating said first bandwidth preferably comprises:

measuring a bandwidth of said high priority traffic in a second predetermined time interval;

forecasting said first bandwidth in said first time interval from said measured bandwidth.

The method may further comprise a step of detecting an end of said high priority traffic burst.

Said step of detecting an end of said high priority traffic burst may comprise:

estimating a second bandwidth of said high priority traffic in a third predetermined time interval;

comparing said second bandwidth with a second predetermined threshold.

The step of estimating said second bandwidth may preferably comprise:

measuring a bandwidth of said high priority traffic in a fourth predetermined time interval;

forecasting said second bandwidth in said third time interval from said measured bandwidth.

Typically, said first threshold is higher than or equal to said second threshold.

The method may further comprise:

after said step of detecting said end of burst, acting on said forwarded portion of said high priority traffic, so as to route said forwarded portion towards at least one switched circuit of said first portion of switched circuits;

tearing down said at least one new temporary switched circuit;

restoring said at least one torn down switched circuit of said second portion of switched circuits.

The step of acting on said forwarded portion of said high priority traffic may be carried out if said second predetermined threshold exceeds said second bandwidth.

In a second aspect, the invention relates to an optical network comprising at least one node and at least one network controller, wherein:

said at least one node comprises a router adapted to tag a first portion of traffic in ingress thereof as high priority traffic and a second portion of traffic in ingress thereof as low priority traffic;

said network controller is adapted to configure at least a portion of said network in order to have a first portion of switched circuits exiting from said at least one node adapted to carry said high priority traffic and a second portion of switched circuits exiting from said at least one node adapted to carry said low priority traffic;

said network controller also comprises a traffic controller adapted to detect a burst of said high priority traffic and to thereby send a first warning signal;

said router is also adapted to act on at least a portion of said low priority traffic in case of receipt of said first warning signal, so as to deplete at least one node interface, connected to at least one switched circuit of said second portion of switched circuits;

said network controller is also adapted to tear down at least one switched circuit connected to said depleted node interface, in case of receipt of said first warning signal;

said network controller is also adapted to set up at least one new temporary switched circuit starting from said at least one depleted node interface;

said router is also adapted to forward a portion of said high priority traffic to said at least one depleted node interface, and, thereby, to said new temporary switched circuit.

The traffic controller is preferably adapted to:

estimate a first bandwidth of said high priority traffic in a first predetermined time interval;

compare said first bandwidth with a first predetermined threshold.

The traffic controller may be also adapted to send said first warning signal if said first bandwidth exceeds said first predetermined threshold.

The traffic controller may be also adapted to:

measure a bandwidth of said high priority traffic in a second predetermined time interval;

forecast said first bandwidth in said first time interval from said measured bandwidth.

The traffic controller may be also adapted to detect an end of said high priority traffic burst and thereby to send a second warning signal.

The traffic controller may be also adapted to:

estimate a second bandwidth of said high priority traffic in a third predetermined time interval;

compare said second bandwidth with a second predetermined threshold.

The traffic controller may be also adapted to:

measure a bandwidth of said high priority traffic in a fourth predetermined time interval;

forecast said second bandwidth in said third time interval from said measured bandwidth.

Typically, said first threshold is higher than or equal to said second threshold.

The optical network of the invention may also be configured so as:

said router is also adapted to act on said forwarded portion of said high priority traffic in case of receipt of said second warning signal, so as to route said forwarded portion towards at least one switched circuit of said first portion of switched circuits;

said network controller is also adapted to tear down said at least one new temporary switched circuit, in case of receipt of said second warning signal;

said network controller is also adapted to restore said at least one torn down switched circuit of said second portion of switched circuits, in case of receipt of said second warning signal.

Typically, said at least one node comprises a switching equipment.

The switching equipment may comprise a digital cross connect, or an optical cross connect, or an add/drop multiplexer, or a fiber switch.

Typically, optical fibers are connected to said switching equipment.

BRIEF DESCRIPTION OF THE DRAWINGS

Further features and advantages of the invention will be made apparent by the following detailed description of some embodiments thereof, provided merely by way of non-limitative examples, description that will be conducted making reference to the attached drawings, wherein.

DETAILED DESCRIPTION OF THE INVENTION

Figure 1:
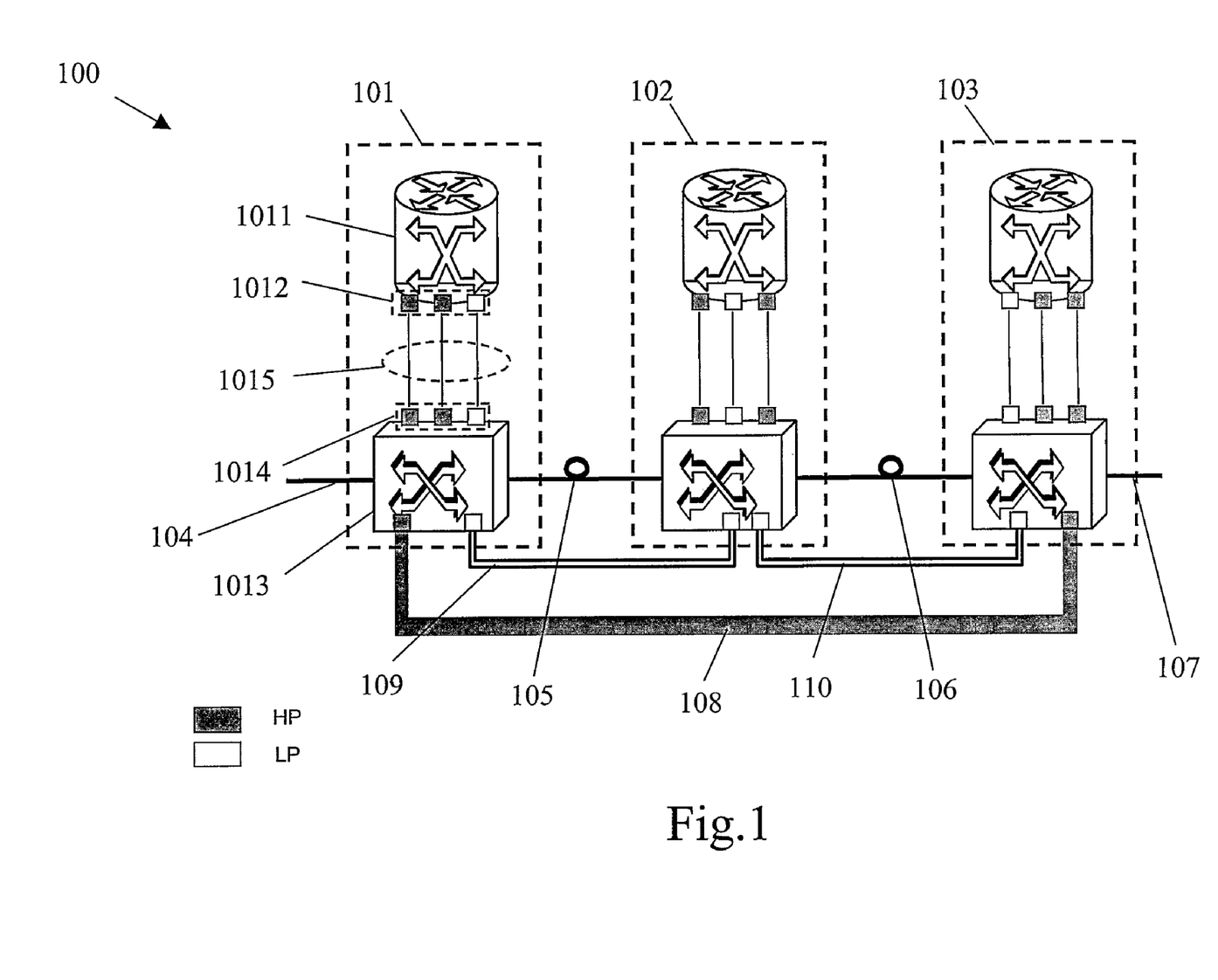
FIG. 1 schematically shows a portion of an exemplary IP/MPLS over optical network configured according to the invention, in case of normal high priority traffic flows.

FIG. 1 shows a portion of an IP/MPLS over WDM or DWDM optical network 100 configured according to the invention, comprising three nodes 101, 102, 103, connected to each other (and to other nodes of the network) by optical fibers 104, 105, 106, 107. It has to be understood that the expression "optical fibers" may comprise one or more optical fibers, typically bundled together in one or more optical cables. In preferred embodiments, the network 100 has automatic switching capabilities. More particularly, each node 101, 102, 103 comprises equipment adapted for adding, and/ or dropping, and/or routing optical signals onto the optical fibers 104, 105, 106, 107. In a WDM or DWDM network such optical signals typically comprise optical carriers, or channels, having predetermined wavelengths (e.g. in a wavelength range around 1550 nm), onto which an information-carrying signal is added, at a predetermined frequency (e.g. in a range from several Mbit/s to several Gbit/s).

With reference to node 101, the node equipment comprises a router 1011, for example an IP/MPLS router, adapted for providing and/or receiving the information-carrying signal to be added and/or discriminated from the respective optical carrier. For this purpose, the router 1011 has respective interfaces 1012. The node 101 further comprises a switching equipment 1013, such as a digital cross connect (DXC), an optical cross connect (OXC), an add/drop multiplexer (OADM), or a fiber switch, adapted for adding to the optical fibers 104, 105 the optical signals originated from node 101, and/or for dropping from the optical fibers 104, 105 the optical signals to be terminated (i.e. received) in node 101, and/or for routing from optical fiber 104 to optical fiber 105 (and/or vice-versa) the optical signals having origin and/or destination different from node 101. Typically, the switching equipment 1013 comprises a switching matrix adapted for switching the incoming optical signals according to a predetermined routing table. The switching equipment 1013 may further comprise a number of wavelength converters. Furthermore, it has respective interfaces 1014 connected by suitable connections 1015 to the interfaces 1012 of the router 1011. The router 1011 is either connected to or integrated with the switching equipment 1013, at the discretion of manufacturers and network operators. In a typical multi-layer scheme, the router 1011 acts as a "client" layer of the "server" transport layer represented by the switching device 1013 and by the optical fibers 104, 105. It has to be understood that the other nodes 102, 103 include equipment similar to node 101, that will not be described for the sake of simplicity and clarity of FIG. 1. FIG. 1 further shows three lightpaths, i.e. three end-to-end switched optical connections, established between nodes 101, 102, 103: more particularly, a first lightpath 108 is established between nodes 101 and 103, a second lightpath 109 is established between nodes 101 and 102, a third lightpath 110 is established between nodes 102 and 103.

Incoming traffic from router 1011 is split in high priority and low priority traffic at the "client" layer. This classification may be carried out based on a service level agreement (SLA), for example regulating a guarantee of a predetermined level of quality of service (QoS). Typically, the high priority traffic is the source of higher revenue for the network operator. It has to be understood that a number of priority levels higher than two may be provided. For example, in an IP/MPLS context, LSPs may be tagged as high priority and low priority within the router 1011.

Figure 2:
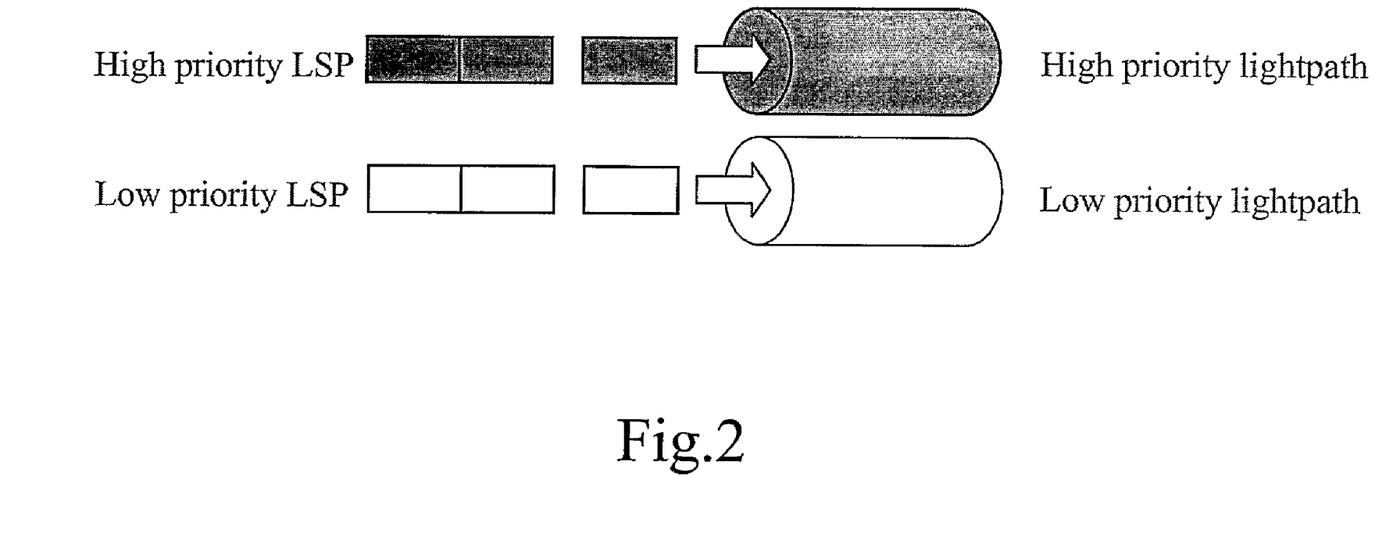
FIG. 2 schematically shows a step of bundling high priority LSPs into high priority lightpaths, and low priority LSPs into low priority lightpaths.

According to the invention, the network 100 is configured by one or more network controllers so as to dedicate separate resources also at the "server" optical layer to high priority traffic and to low priority traffic. More particularly, the lightpaths are also classified as high priority lightpaths and low priority lightpaths: high priority lightpaths are selected to carry high priority traffic, whereas low priority lightpaths are selected to carry low priority traffic, as schematically shown in FIG. 2. However, it has not to be excluded that low priority traffic could travel along lightpaths tagged as high priority lightpaths, during periods of underutilization by high priority traffic. The network controller may be either centralized or distributed. In order to accomplish the "ordered" arrangement of the lightpaths, the interfaces of the router 1011 and of the switching equipment 1013 are also tagged as high priority interfaces and low priority interfaces. As a guideline for classification in "high priority" and "low priority" of the lightpaths, routing characteristics (e.g. path length, number of crossed nodes) and/or survivability policies (e.g. protection, restoration, no protection etc.) can be taken into account.

The above arrangement of the network 100 is schematically shown in FIG. 1 by a different grayscale of the resources dedicated to high priority and to low priority traffic, both at the "client" layer and at the "server" layer. As it can be seen, the first lightpath 108 between nodes 101 and 103 is tagged as high priority, whereas the second and third lightpaths 109, 110 between nodes 101 and 102 and between nodes 102 and 103 are tagged as low priority. Furthermore, a number of router and switching equipment interfaces are also tagged according to above classification.

According to the invention, the so configured network 100 is capable to promptly react to traffic bursts of high priority traffic. In case of possible high priority traffic congestion, at least one low priority lightpath is torn down, thus making available new resources for the "excess" high priority traffic, at least for a limited period of time. In order to implement this method, at least one router interface allocated to low priority traffic (together with the corresponding switching equipment interface) is depleted from low priority traffic. This could correspond to a re-distribution of the low priority traffic previously carried by the depleted interface to another low priority interface (or to more than one interface) connected to lightpath(s) towards the same destination, if a sufficient bandwidth level is available for low priority traffic. On the contrary, if the available bandwidth level for low priority traffic is not sufficient, the excess low priority traffic is dropped. After depletion of a sufficient number of low priority node interfaces, the same interfaces are temporarily tagged as high priority, and the excess high priority traffic is re-distributed through such temporary high priority interfaces. Low priority lightpaths corresponding to the depleted interfaces are torn down, so as to make available resources (e.g. fibers, optical channels) within the network, ready to be temporary used for setting up new connection requests needed for coping with the high priority traffic burst.

The above steps do not exclude that other attempts could be made before tearing down a low priority lightpath. For example, if low priority traffic flows in a high priority lightpath due to previous underutilization, low priority traffic bandwidth may be preempted in favor of the high priority traffic. If it is not enough, a re-distribution of the high priority traffic may be attempted using already established high priority lightpaths towards the same destination; a further attempt can be made in order to identify a possible low priority lightpath towards the same destination that has appropriate characteristics to be "transformed", at least temporarily, in a high priority lightpath, i.e. to be depleted from low priority traffic in favor of high priority traffic.

A possible congestion due to high priority traffic burst may be determined by monitoring the high priority traffic bandwidth at the egress of the routers (i.e. at the egress of the client layer), or, in other words, the high priority traffic in ingress to the switching equipment (i.e. at the ingress of the server layer). For example, the monitoring may be performed by collecting (e.g. via Simple Network Management Protocol, or SNMP) raw data, such as for example bit sent/received, packet discards, incorrect packets, buffer occupancy etc., as stored in a logging database, such as for example a Management Information Base (MIB). The collection of traffic samples may be carried out for a certain time interval, or observation window. A prediction algorithm may also be implemented, in order to predict, from the monitoring in a first time interval, the bandwidth requirements of high priority traffic in a subsequent second time interval. The trigger of the process for the tearing down of low priority lightpaths and the setting up of new temporary high priority lightpaths can be the overcoming of a first threshold bandwidth $T_{high}$ by the monitored or predicted high priority bandwidth. A second threshold bandwidth $T_{low}$ could be also set, in order to trigger a restore of the initial lightpath configuration when the monitored or predicted high priority traffic bandwidth becomes lower, corresponding to the end of the high priority traffic burst. A traffic controller device may be responsible for elaborating the above mentioned collected raw data, in order to predict traffic dynamics and taking a decision on whether or not requesting to a control plane of the optical layer the tearing down of a low priority lightpath and a setup of a temporary high priority lightpath (e.g. via UNI or other kind of signaling).

Figure 3:
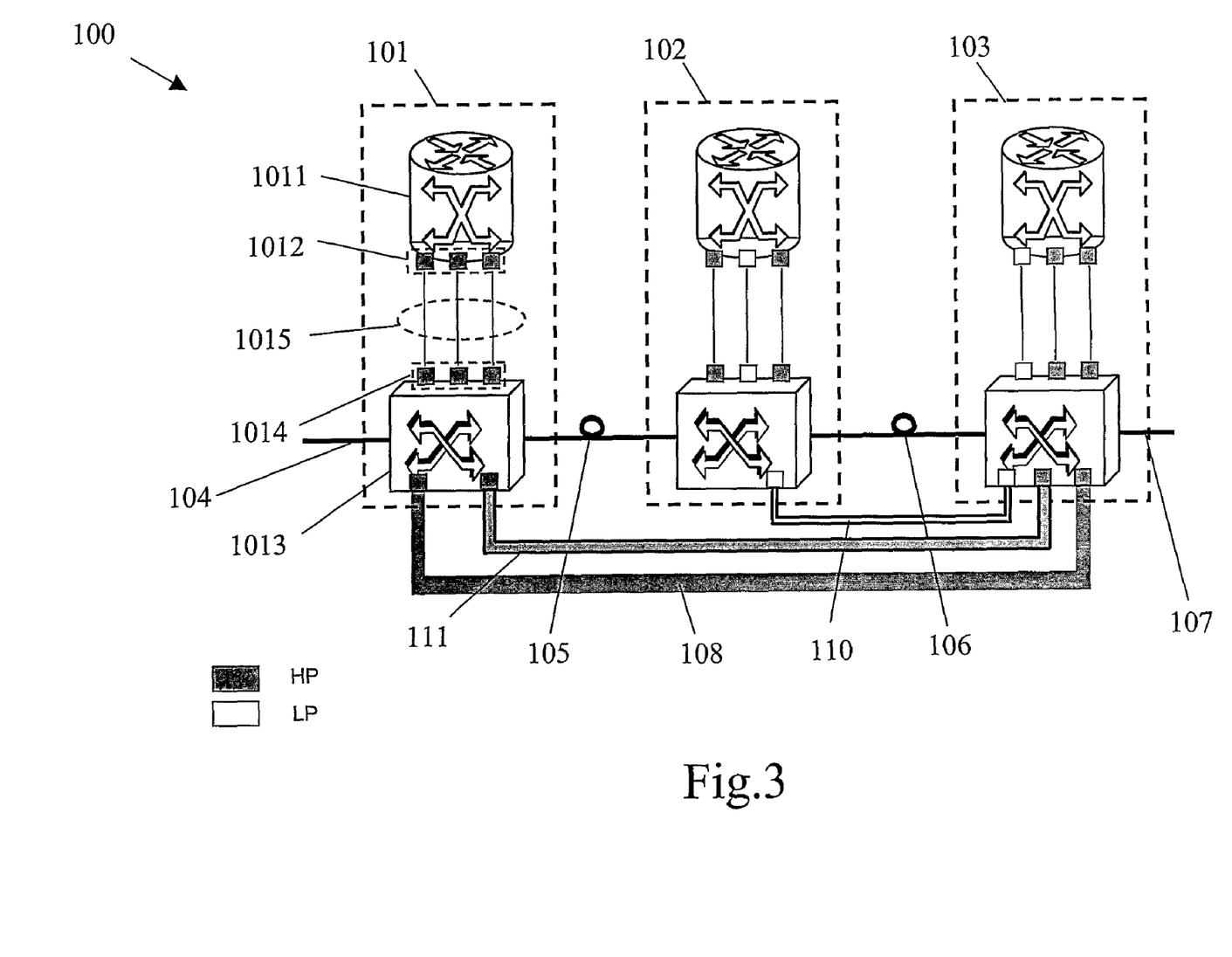
FIG. 3 schematically shows the portion of optical network of FIG. 1 reconfigured according to an embodiment of the invention, during a burst of high priority traffic.

Exemplarily, with specific reference to FIG. 1, a traffic controller can monitor the packet traffic crossing the high priority router ports, in order to monitor the high priority traffic to be inserted in the high priority lightpath 108 terminating in node 103. If the traffic controller determines that the high priority ports cannot sustain the incoming high priority traffic bandwidth having the node 103 as destination, a warning signal is raised, so that low priority traffic is managed by the router 1011 in order to deplete its remaining port tagged as low priority port from low priority traffic, i.e., in this example, by dropping the corresponding low priority traffic. A communication is also established between the client equipment and the server equipment, by means of a further warning signal sent to the network controller of the optical network 100, to obtain the tearing down of the low priority lightpath 109 between node 101 and node 102, and the set-up of a new high priority lightpath between node 101 and node 103. The resulting network configuration after the setting-up of the new lightpath, in this example, is thus shown in FIG. 3, in which two high priority lightpaths 108 and 111 are now present between nodes 101 and 103. When the traffic controller reveals that the traffic burst is finishing, a further warning signaling is initiated, so that the initial situation shown in FIG. 1 can be restored.

This method can be applied by using known signaling techniques, either in presence of a centralized network controller adapted to set-up/tear down lightpaths within the whole network, or in presence of distributed network controllers, adapted to perform coordinated steps carried out locally at the various nodes. For example, in an IP/MPLS over ASON/GMPLS context, the connection controller of a Control Plane can initiate the tear-down and set-up of the locally originated lightpaths, for example at node 101 (e.g. by User Network Interface, UNI). Then, a Node Network Interface (NNI) signaling can be used in order to send information to the other network nodes in order to perform the reconfiguration of the lightpaths. Furthermore, UNI signaling can be used for suitably tagging the router interfaces 1012 and the switching equipment interfaces 1014 within the nodes involved in the reconfiguring process. It is reminded here that the acronym ASON stays for Automatically Switched Optical Network.

Figure 4:
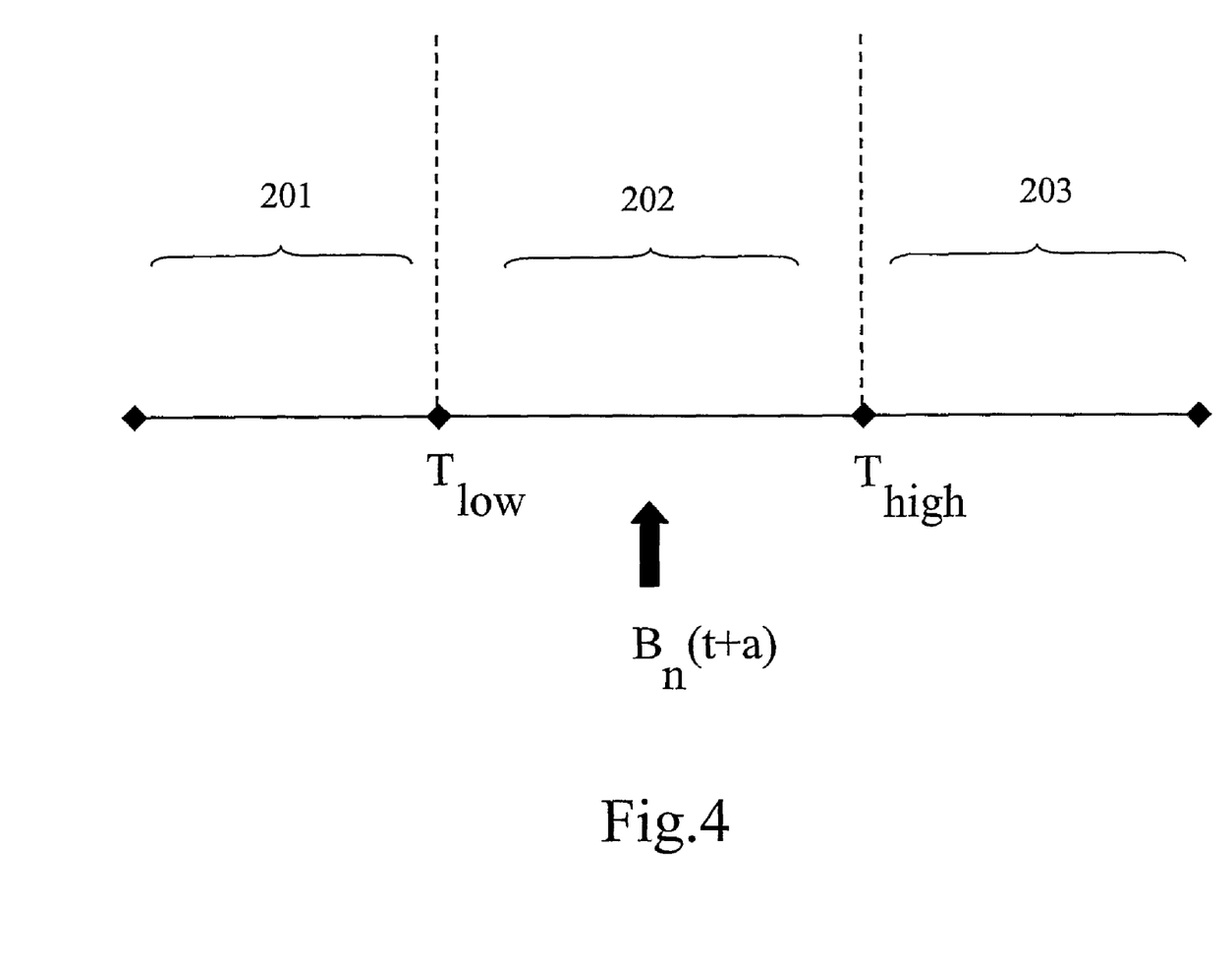
FIG. 4 schematically shows a step of comparing an estimated bandwidth of high priority traffic with pre-selected bandwidth thresholds.

FIG. 4 schematically shows how the potential occurrence of a congestion due to high priority traffic can be detected in a preferred embodiment of the present invention, so as to decide whether or not a tearing down of a low priority lightpath should be performed. Specifically, at a time t the bandwidth $B_n(t)$ of the high priority traffic crossing a certain interface is measured, and a predicted bandwidth $B_n(t+a)$ at a subsequent time t+a is evaluated, e.g., by means of known prediction algorithms. In preferred embodiments, two bandwidth thresholds $T_{low}$ and $T_{high}$ can be set, in order to identify underutilization operative conditions 201, normal operative condition 202, congestion condition 203, of the monitored interface. However, a single threshold may also be set. For example, in FIG. 4, $B_n(t+a)$ corresponds to normal operative conditions of the interface, i.e., the interface is able to manage the incoming high priority traffic. In case $B_n(t+a)$ crosses from left to right the bandwidth threshold $T_{high}$, a decision making function may automatically trigger the dropping of resources tagged as low priority in favor of high priority traffic, together with the management of the admission of a portion of high priority traffic to proper interfaces. The crossing from right to left of the second bandwidth threshold $T_{low}$ may identify the end of the high priority traffic burst, and thus the triggering of the restore of the initial network configuration. As another example, in case $B_n(t+a)$ crosses (from right to left) the bandwidth threshold $T_{low}$, a further decision may be taken, for example of admitting a portion of low priority traffic onto resources tagged as high priority.

Example

An exemplary network node composed by an IP/MPLS edge router over an OXC, in a network scenario IP/MPLS over ASON/GMPLS, has been considered by the Applicant for performing a simulation. In normal operative conditions of the network (i.e., in absence of congestion due to high priority traffic bursts), a pool of router interfaces were allocated to high priority traffic, i.e. to high priority MPLS LSPs, whereas the remaining router interfaces were allocated to low priority traffic, i.e. to low priority MPLS LSPs. At the egress of the "client" IP/MPLS layer network, a packet traffic monitoring was carried out periodically, at predefined observation windows. To enforce traffic monitoring, a prediction algorithm was also implemented, in order to estimate the short-term evolution in time of the incoming data traffic and to detect the occurrence of traffic bursts and possible interface congestions. The implementation of a prediction algorithm advantageously allows to detect in advance the occurrence of a traffic burst, so that the network controller may have time to take the suitable decision in order to cope with the burst.

Figure 5:
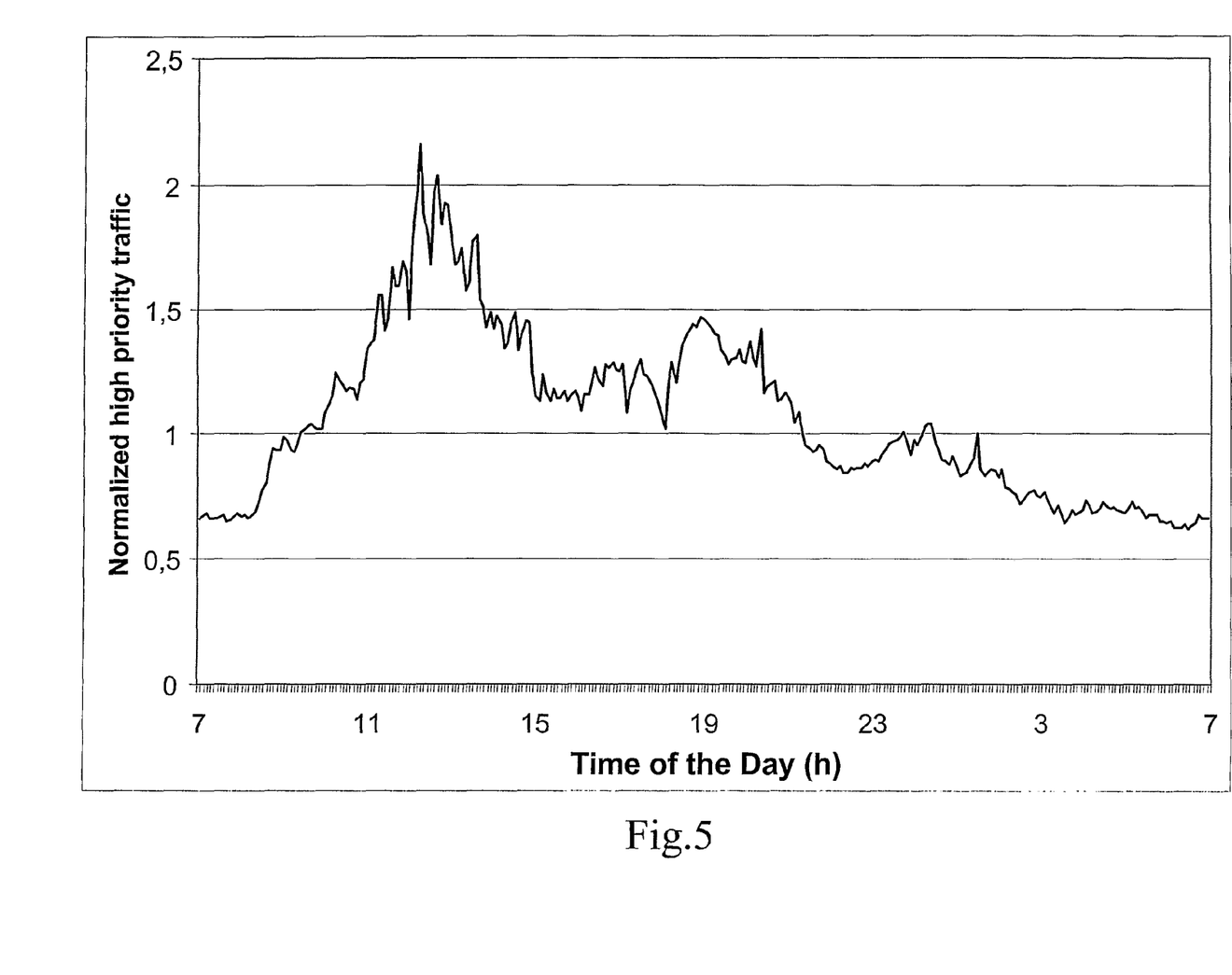
FIG. 5 shows an exemplary daily high priority traffic evolution.

FIG. 5 shows the traffic trace of the high priority IP/MPLS traffic, crossing, during a whole day, a high priority router interface, that was considered for the simulation. The traffic trace shown in FIG. 5 is normalized to the router interface bit-rate (31 Mbps was the considered capacity), so that when the trace crosses the ordinate value 1, a single interface is not sufficient anymore to sustain the traffic, as well as when the trace crosses the ordinate value 2, a pair of interfaces is not sufficient anymore to sustain the traffic.

However, since the incoming traffic is not known a priori by the network management system, in order to prevent traffic congestion (more particularly, to predict a potential occurrence of node congestion), both simulated traffic monitoring and traffic prediction were carried out at each high priority router interface. The throughput of the interfaces as well as the bandwidth requirements of the already established high priority MPLS LSPs were respectively monitored and predicted using an Observation Window (OW) of one minute. The predicted aggregated traffic (MPLS LSPs) crossing the interfaces was compared to preselected thresholds of imminent congestion and underutilization ($T_{high}$ and $T_{low}$), in order to decide whether to deplete a low priority interface for establishing a new high priority lightpath, to cope with high priority traffic variations and bursts, according to the invention. The $T_{high}$ threshold used to detect congestion corresponded to 97% of the interface capacity (i.e. 97% of 31 Mbps), whereas the $T_{low}$ threshold was set to 75%.

To carry out the prediction of the incoming traffic to each IP/MPLS router interface, an adaptive Least Mean Square error linear predictor has been used. Algorithms of this kind are described, for example, in A. Adas, "Using Adaptive Linear Prediction to support real-time VBR video", IEEE/ACM Transactions on Networking, Vol. 6, No 5, October 1998, or in S. Haykin, "Adaptive Filter theory", Prentice Hall, 1991 (pag. 299-356). According to the Applicant, this kind of algorithm can be practically implemented as an on-line algorithm for forecasting traffic requirements as part of the network management system. A k-step linear predictor is concerned with the estimation (prediction) of x(n+k) using a linear combination of the current and previous values of x(n), wherein x represents the actual traffic bandwidth. A pth-order linear predictor has the form:

$$\hat{\chi}(n+k) = \sum_{l=0}^{p-1} w(l) x(n-l)$$

where w(l) are prediction filter coefficients, and uses the following variables:
  Prediction Sample Period=τ
  Number of sample periods used to predict the k consecutive future values of throughput interface: p Practically, the past p samples are used to predict the utilization for the next k samples. The aim of the linear predictor is to minimize the mean square error defined as:

$$e(n) = x(n+k) - \hat{\chi}(n+k)$$

Figure 6:
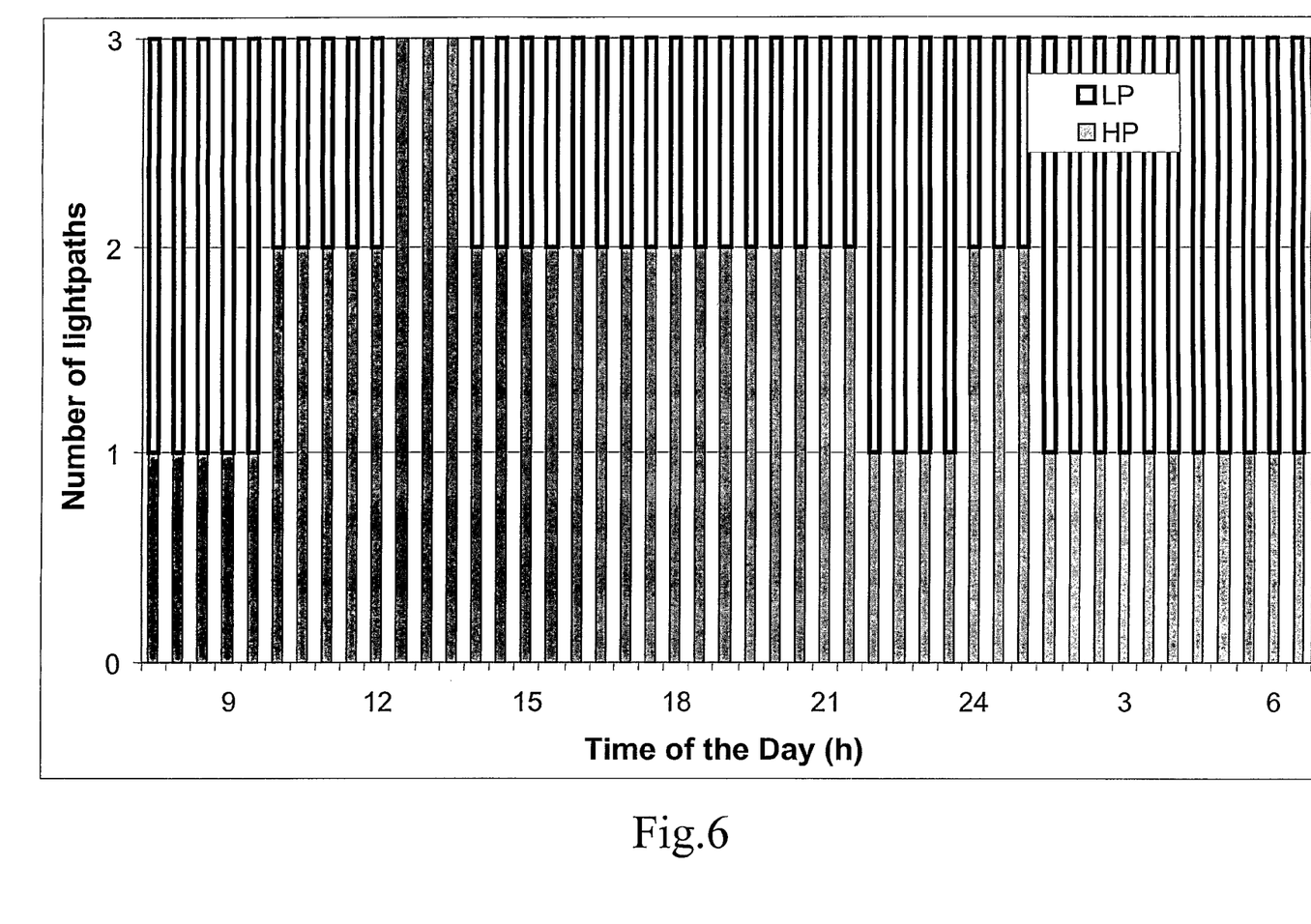
FIG. 6 shows the result of a simulation test obtained using the daily high priority traffic evolution shown in FIG. 5.

FIG. 6 shows the result of the simulation. In particular, FIG. 6 shows the number of established high priority lightpaths versus time, that are used to transport the high priority traffic having the trace shown in FIG. 5, as well as the low priority lightpaths established in time periods of normal traffic. The number of high priority lightpaths is schematized in FIG. 6 with full bars, whereas the number of low priority lightpaths is schematized with empty bars. As depicted in FIG. 6, the number of established high priority lightpaths rises and falls following the high priority dynamics.

As shown by the above results, the method of the invention allows to react to the high priority traffic variations, even in case of a strong variations of traffic. As a consequence, when an expected or unexpected high priority traffic peak occurs, the method of the invention allows to detect it and to react accordingly. Moreover, the results show that the method of the invention allows to drop resources to the low priority traffic only when they are needed to prevent network congestion due to high priority traffic peaks. Furthermore, the method also aims at minimizing the drop time of a low priority lightpath in favor of the high priority traffic.

Up to now, the method of the invention has been explained by making specific reference to the WDM or DWDM network of FIG. 1, specifically to an exemplary IP/MPLS over ASON/GMPLS optical network, in which a single, circuit switched "server" layer (ASON, optical WDM layer) is associated to a packet switched "client" layer (MPLS). It has to be understood that circuit switched networks in which other "server" layers are used in place of or in combination with an optical WDM layer may benefit of the above explained method. For example, the network may be configured as a TDM network, such as for example a SONET/SDH network, using TDM circuits in place of or in combination with WDM circuits. TDM circuits, such as for example STM circuits, and/or virtual container circuits (as defined in ITU-T Rec. G.707), can be also tagged as high priority circuits and low priority circuits, and be subjected to the circuit management above explained with reference to the lightpaths of an optical WDM or DWDM network.

Figure 7:
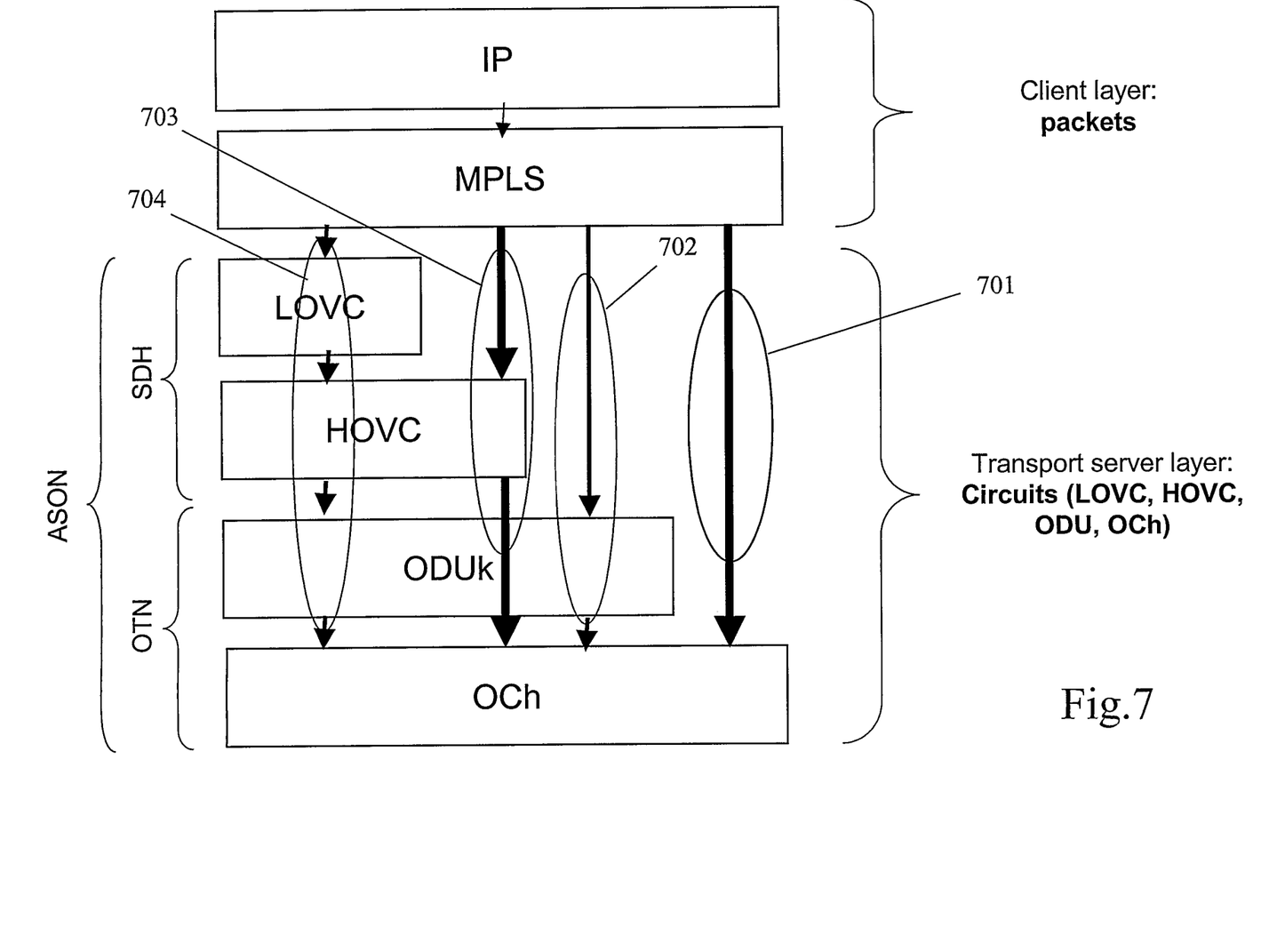
FIG. 7 shows, in a schematized view, different possible "server" layer segmentations that may be used by a "client" packet network.

Specifically, FIG. 7 shows, in a schematized view, different possible "server" layer segmentations used by a "client" IP/MPLS packet. The packets may be mapped directly (connection 701 in FIG. 7) on switched circuits at the optical server layer (i.e. lightpaths, indicated as OCh in FIG. 7), as in the exemplary network of FIG. 1; in another possible scheme (connection 702), packets are first mapped in ODU (Optical Digital Unit) circuits, and then the ODU circuits are mapped in OCh circuits; in another possible scheme (connection 703) packets are first mapped in HOVC (Higher Order Virtual Container) circuits, and then the HOVC circuits are mapped in OCh circuits; in another possible scheme (connection 704), packets are first mapped in LOVC (Lower Order Virtual Container) circuits, then LOVC circuits are mapped in HOVC circuits, then HOVC circuits are mapped in ODU circuits, then ODU circuits are mapped in OCh circuits, thus exploiting all possible segmentation server layers.

The classification in high priority and low priority can be applied to switched circuits belonging to any "server" layer, following the same guidelines explained above with reference to the optical WDM "server" layer. Preferably, if the "client" traffic is mapped onto different nested switched circuits, the classification in "high priority" and "low priority" is performed at all "server" layers used, so that the lowest hierarchy high priority "server" layer is adapted to transport high priority traffic packets, and higher hierarchy high priority server circuits are adapted to transport lower hierarchy high priority server circuits. The same applies for low priority traffic, as well as for lower hierarchy and higher hierarchy low priority switched circuits. However, it has not to be excluded that lower hierarchy low priority switched circuits could be mapped onto higher hierarchy switched circuits tagged as high priority switched circuits, during periods of underutilization by high priority traffic.

The above mentioned procedure of tearing down of the low priority switched circuits in case of detection of a high priority traffic burst, in order to make resources available within the network for a set-up of a new temporary high priority switched circuit, can also be applied to any and/or all the "server" layers of FIG. 7. After detection and/or forecasting of a high priority traffic burst, the tearing down of a low priority switched circuit, and a consequent set-up of a new, temporary, high priority switched circuit can be adopted at any suitable "server" layer, according to the needing.

A main advantage in using different nested "server" layers is that data traffic can be managed more efficiently, since a number of possible routing solutions can be adopted, among which the best one can be eventually chosen. For example, virtual concatenation in a SONET/SDH network allows a breaking of the traffic bandwidth into individual virtual containers belonging to a same virtual container group. The individual virtual containers can be routed onto different lightpaths having the same destination, and then be recombined together at the destination node. This may avoid the set-up of a new higher hierarchy switched circuit in order to manage, at least in an initial phase, a possible congestion of a node interface.

Furthermore, a higher "granularity" of intervention, even in case of detection of a burst, can be exploited in a network using a plurality of "server" layers. For example, in case of detection and/or forecasting of a possible congestion in a network node due to high priority traffic, a first intervention may include an increase of the capacity assigned to a virtual container group, by addition of a suitable number of virtual containers, until a maximum capacity of the virtual container group is reached. If such procedure does not sufficiently cope with the traffic burst, a tearing down of a low priority virtual container, and/or of a higher hierarchy low priority switched circuit, may be performed in order to make available resources within the network for the excess high priority traffic. On the other hand, when an imminent end of the high priority traffic burst is detected and/or forecasted, a first intervention in the opposite direction may be of progressively decreasing the capacity of a new temporary high priority virtual container group previously set-up after the detection of the burst, before performing a complete tearing down of the temporary virtual container group. A further granularity of intervention may be provided by a LCAS (Link Capacity Adjustment Scheme) functionality (as defined in ITU-T Rec. G.7042), that may act to vary a bandwidth assigned to at least a portion of the virtual containers when a traffic variation is detected. Furthermore, virtual concatenation and/or link capacity adjustment of lower hierarchy circuits has the advantage of allowing the transport of traffic having different priority carried by lower hierarchy circuits in higher hierarchy circuits.

Figure 8:
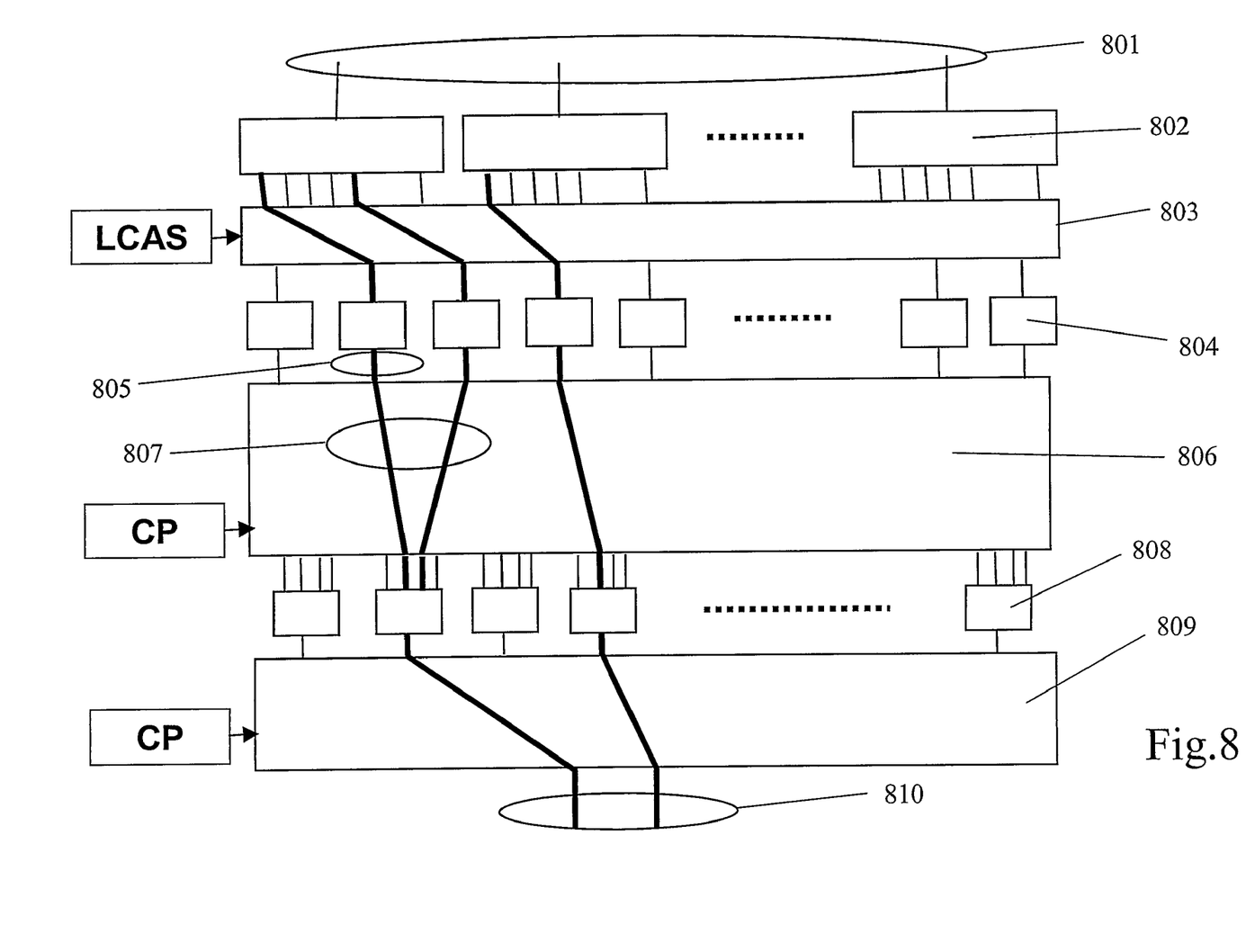
FIG. 8 schematically shows a network node using two nested "server" layers connected to a client layer.

FIG. 8 schematically shows an exemplary network node of a network exploiting multiple server layers, i.e. a lower hierarchy switched circuit (SDH Higher Order Virtual Container) and a higher hierarchy switched circuit (OCh, or lightpath). Data traffic coming from an edge node with tributary interfaces (e.g. an IP/MPLS router with GbE interfaces) is inserted through interfaces 801 in the mapping/demapping subsystems 802 (e.g. termination of GbE signals and GFP framing). The incoming packets are then mapped into lower hierarchy circuits of suitable payload (e.g. HO VC at 150 Mbit/s). A first portion of the interfaces 801 is allocated to high priority traffic, whereas a second portion thereof is allocated to low priority traffic. A Selector 803 connects the mapping/demapping subsystems to the available HO VC termination points 804. Different HO VC 805 may be virtually concatenated in a Virtual Container Group 807 if the carried traffic should reach the same destination, even via differently routed lightpaths towards the same destination. The HO VC Fabric 806 allows cross-connection of the HO VC towards an OCh Fabric 809 (e.g. in an Optical Cross Connect), through Adaptation/Termination Points 808. In such Adaptation/Termination Points 808, the HO VC circuits are properly adapted/terminated (according to the SDH multiplexing scheme) for mapping into optical WDM higher hierarchy circuits (i.e. lightpaths) of suitable payload (e.g. 2.5 Gbit/s). The OCh Fabric 809 separates in ordered manner the lightpaths 810 carrying high priority Higher Order Virtual Containers and low priority Higher Order Virtual Containers, i.e. low priority lightpaths and high priority lightpaths, according to the destination and priority policies.

In the exemplary network node shown in FIG. 8, a monitoring is performed at the interfaces 801, in order to detect high priority traffic bursts, as explained above with reference to the IP/MPLS over WDM network of FIG. 1. An optical Control Plane CP may perform a calculation and/or prediction of the number of Virtual Containers and/or of the number of WDM circuits required in order to cope with the burst of the high priority traffic. Based on the result of the calculation, the Control Plane can act at different levels, for example suitably driving a LCAS controller in order to modify, at the Virtual Concatenation Selector 803, the bandwidth of at least a portion of the Virtual Containers. However, if the bandwidth adjustment is not sufficient to cope with the burst, the Control Plane CP may act in order to tear down low priority circuits, at the HO VC layer and/or at the OCh layer. Interfaces 801 corresponding to the torn down low priority circuits are also depleted from low priority traffic, as previously described. In such way, resources made available within the network by the tearing down of low priority circuits can then be used in order to set-up new, temporary high priority circuits to carry the high priority excess traffic.

The invention claimed is:

1. A method of managing traffic in an optical network, comprising:
    tagging a first portion of traffic in ingress to at least one node of said network as high priority traffic and a second portion of traffic in ingress to said at least one node as low priority traffic;
    configuring at least a portion of said network so that a first portion of lightpaths exiting from said at least one node is classified as high priority lightpaths and adapted to carry said high priority traffic and a second portion of lightpaths exiting from said at least one node is classified as low priority lightpaths and adapted to carry said low priority traffic;
    detecting a burst of said high priority traffic;
    after said step of detecting said burst, acting on at least a portion of said low priority traffic, so as to deplete at least one interface of said at least one node, connected to at least one of said low priority lightpaths;
    tearing down said at least one low priority lightpath connected to said at least one depleted node interface;
    setting up at least one new temporary high priority lightpath starting from said at least one depleted node interface; and
    forwarding a portion of said high priority traffic to said at least one depleted node interface, and, thereby, to said new temporary high priority lightpath.

2. The method according to claim 1, wherein said step of detecting a burst comprises:
    estimating a first bandwidth of said high priority traffic in a first predetermined time interval; and
    comparing said first bandwidth with a first predetermined threshold.

3. The method according to claim 2, wherein said step of acting on at least a portion of low priority traffic is carried out if said first bandwidth exceeds said first predetermined threshold.

4. The method according to claim 2, wherein said step of estimating said first bandwidth comprises:
    measuring a bandwidth of said high priority traffic in a second predetermined time interval; and
    forecasting said first bandwidth in said first time interval from said measured bandwidth.

5. The method according to claim 2, further comprising detecting an end of a burst of said high priority traffic.

6. The method according to claim 5, wherein step of detecting an end of said burst of said high priority traffic comprises:
    estimating a second bandwidth of said high priority traffic in a third predetermined time interval; and
    comparing said second bandwidth with a second predetermined threshold.

7. The method according to claim 6, wherein said step of estimating said second bandwidth comprises:
   measuring a bandwidth of said high priority traffic in a fourth predetermined time interval; and
   forecasting said second bandwidth in said third time interval from said measured bandwidth.

8. The method according to claim 6, wherein said first threshold is higher than or equal to said second threshold.

9. The method according to claim 5, further comprising:
   after said step of detecting said end of burst, acting on said forwarded portion of said high priority traffic so as to route said forwarded portion toward at least one of said high priority lightpaths;
   tearing down said at least one new temporary high priority lightpath; and
   restoring said at least one torn down low priority lightpath.

10. The method according to claim 9, wherein said step of acting on said forwarded portion of said high priority traffic is carried out if said second predetermined threshold exceeds said second bandwidth.

11. An optical network comprising:
   at least one node comprising a router adapted to tag a first portion of traffic in ingress thereof as high priority traffic and a second portion of traffic in ingress thereof as low priority traffic;
   at least one network controller adapted to configure at least a portion of said network in order to have a first portion of lightpaths exiting from said at least one node classified as high priority lightpaths and adapted to carry said high priority traffic and a second portion of lightpaths exiting from said at least one node classified as low priority lightpaths and adapted to carry said low priority traffic;
   said network controller also comprising a traffic controller adapted to detect a burst of said high priority traffic and to thereby send a first warning signal;
   said router also being adapted to act on at least a portion of said low priority traffic in case of receipt of said first warning signal, so as to deplete at least one node interface, connected to at least one of said low priority lightpaths;
   said network controller also being adapted to tear down said at least one low priority lightpath connected to said at least one depleted node interface, in case of receipt of said first warning signal;
   said network controller also being adapted to set up at least one new temporary high priority lightpath starting from said at least one depleted node interface; and
   said router also being adapted to forward a portion of said high priority traffic to said at least one depleted node interface, and, thereby, to said new temporary high priority lightpath.

12. The optical network according to claim 11, wherein said traffic controller is adapted to:
   estimate a first bandwidth of said high priority traffic in a first predetermined time interval; and
   compare said first bandwidth with a first predetermined threshold.

13. The optical network according to claim 12, wherein said traffic controller is adapted to send said first warning signal if said first bandwidth exceeds said first predetermined threshold.

14. The optical network according to claim 12, wherein said traffic controller is also adapted to:
   measure a bandwidth of said high priority traffic in a second predetermined time interval; and
   forecast said first bandwidth in said first time interval from said measured bandwidth.

15. The optical network according to claim 12, wherein said traffic controller is also adapted to detect an end of said high priority traffic burst and thereby to send a second warning signal.

16. The optical network according to claim 15, wherein said traffic controller is also adapted to:
   estimate a second bandwidth of said high priority traffic in a third predetermined time interval; and
   compare said second bandwidth with a second predetermined threshold.

17. The optical network according to claim 16, wherein said traffic controller is also adapted to:
   measure a bandwidth of said high priority traffic in a fourth predetermined time interval; and
   forecast said second bandwidth in said third time interval from said measured bandwidth.

18. The optical network according to claim 16, wherein said first threshold is higher than or equal to said second threshold.

19. The optical network according to claim 15, wherein:
   said router is also adapted to act on said forwarded portion of said high priority traffic in case of receipt of said second warning signal, so as to route said forwarded portion toward at least one of said high priority lightpaths;
   said network controller is also adapted to tear down said at least one new temporary high priority lightpath, in case of receipt of said second warning signal; and
   said network controller is also adapted to restore said at least one torn down low priority lightpath, in case of receipt of said second warning signal.

20. The optical network according to claim 11, wherein said at least one node comprises switching equipment.

21. The optical network according to claim 20, wherein said switching equipment comprises a digital cross connect, or an optical cross connect, or an add/drop multiplexer, or a fiber switch.

22. The optical network according to claim 20, comprising optical fibers connected to said switching equipment.

* * * * *